United States Patent Office 3,419,557
Patented Dec. 31, 1968

3,419,557
PRODUCTION OF FLUORUBIN AND SUBSTITUTION PRODUCTS THEREOF FROM DIAMINOQUINOXALINES
Werner Deuschel and Wolfgang Vilsmeier, Ludwigshafen (Rhine), and Guenther Riedel, Mannheim, Germany, assignors to Badische Anilin- & Soda-Fabrik Aktiengesellschaft, Ludwigshafen (Rhine), Germany
No Drawing. Filed Dec. 20, 1961, Ser. No. 160,942
Claims priority, application Germany, Dec. 29, 1960, B 60,672
5 Claims. (Cl. 260—250)

ABSTRACT OF THE DISCLOSURE

A process for production of fluorubins by heating diaminoquinoxalines is described.

Altermatt and Jackson et al. are cited to show the state of the art.

---

This invention relates to the production of fluorubin and substitution products thereof.

It is known that fluorubin (6,13-dihydro-5,6,7,12,13,14-hexazapentazene-I):

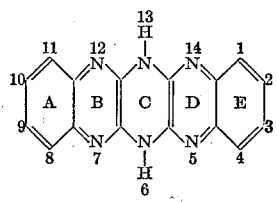

can be prepared by reacting 2,3-dichloroquinoxaline with 2,3-diaminoquinoxaline (Ber. 36, 4048 (1903) and U.S. patent specification No. 2,495,202). A crude fluorubin is thus obtained in a yield of about 65%. The crude product must be subjected to further purification methods, as for example boiling up with various solvents or fractional precipitation of the sulfate from 96% sulfuric acid in order to obtain a chemically pure product. Considerable loss of yield occurs in these purification methods so that only about 30 parts of pure fluorubin is obtained finally from 100 parts of 2,3-dichloroquinoxaline.

The object of this invention is to provide a simple process for the production of a pure fluorubin which, when in high purity and suitable fine dispersion such as obtained for example by grinding or solution in 96% sulfuric acid and reprecipitation, constitutes a yellow pigment having high tinctorial strength and outstanding fastness properties.

This object is achieved and fluorubin or substitution products thereof which contain substituents in positions 1 to 4 and 8 to 11, such as halogens, low molecular weight alkyl or alkoxy groups or to which further aromatic rings may be anellated, are obtained in pure form in an advantageous way, by heating to temperatures of about 100° to 400° C.

(a) 2,3-diaminoquinoxaline,
(b) a 2,3-diaminoquinoxaline substituted in the benzene nucleus,
(c) a derivative of 2,3-diaminoquinoxaline bearing anellated rings, or
(d) a 2,3-diaminoquinoxaline substituted on an amino group by a 2-aminoquinoxalinyl-(3) radical, if desired in 0.5 to 20 times its weight of a diluent which has a boiling point above about 100° C. and if necessary with the addition of an acid catalyst.

Preferred substituents on the benzene ring of 2,3-diaminoquinoxaline are low molecular weight alkyl radicals, for example methyl, ethyl and n-butyl groups, low molecular weight alkoxy groups, having 1 to 4 carbon atoms, and halogens, for example chlorine or bromine atoms.

A considerable advantage of the process according to the present invention over the methods already known for the production of fluorubin resides in the fact that only one initial substance—2,3-diaminoquinoxaline or its substitution or anellation products—is required and that no hydrogen chloride occurs during the reaction so that the reaction vessel is preserved from corrosion. Furthermore the fluorubin is obtained in a coarsely crystalline pure form so that it can be filtered very well and, after washing with methanol, can be subjected to a "pigment finish." The yield of pure fluorubin crude product is up to 95% of the theory with reference to 2,3-diaminoquinoxaline used. This crude product may be converted by simple fine dispersion methods with only about 2% loss into a yellow pigment which is far superior in the purity of its shade, in its fastness to plasticizers and above all in its yield to the yellow pigments obtained by the known methods and the stated purification and fine dispersion methods.

The invention relates especially to the production of fluorubins of the formulae:

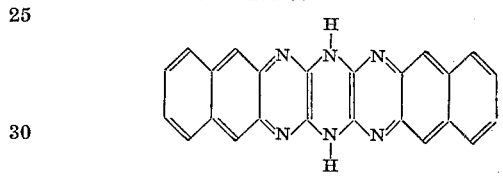

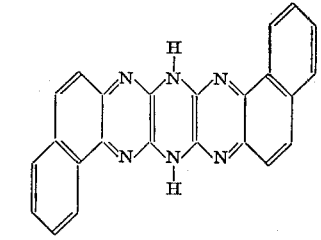

and

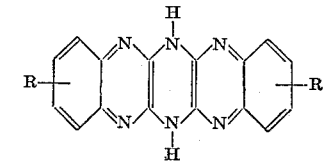

in which R denotes a hydrogen atom, chlorine atom, bromine atom, low molecular weight alkyl radical or low molecular weight alkoxy radical, by heating diaminoquinoxalines of the formulae:

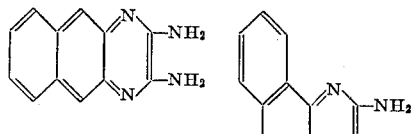

and

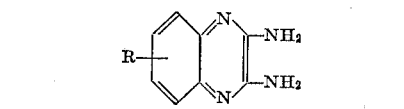

in which R has the meanings given above, to 100° to 400° C.

This reaction is preferably carried out in an organic diluent, N,N-dialkylamides, N-alkyl-lactams benzene derivatives, naphthalene derivatives, high boiling point ethers, silicone oils or paraffin oils.

It is advantageous to carry out the reaction in the presence of 1 to 5 times the weight, with reference to the diaminoquinoxaline, of an N-alkyl-lactam, preferably N-methylpyrrolidone-(2) or N-ethylpyrrolidone-(2).

The reaction proceeds more rapidly when an acid catalyst is added. It is preferred to use aromatic sulfonic acids, mineral acids or salts of strong acids with weak bases as catalysts.

A modification of the process according to this invention comprises converting diaminoquinoxalines of the formulae:

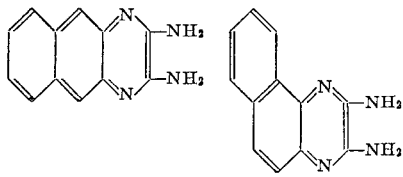

and

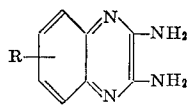

in which R denotes a hydrogen atom, a chlorine atom, a bromine atom, a low molecular weight alkyl radical or a low molecular weight alkoxy radical, by heating to 100° C. to 140° C. into compounds of the formulae:

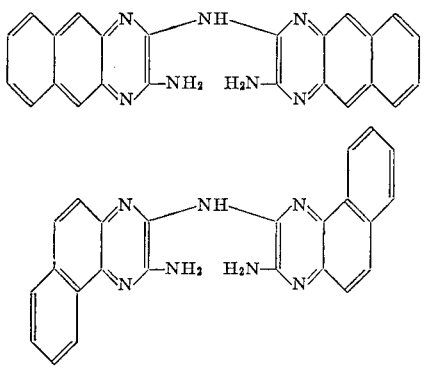

and

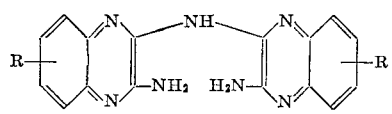

in which R has the meanings given above and condensing these to fluorubins by splitting off a molecule of ammonia by further heating at 140° to 400° C.

Furthermore the invention relates to the production of fluorubins by heating to 140° to 400° C. 3,3'-2,2'-bis-quinoxaloimides of the formulae:

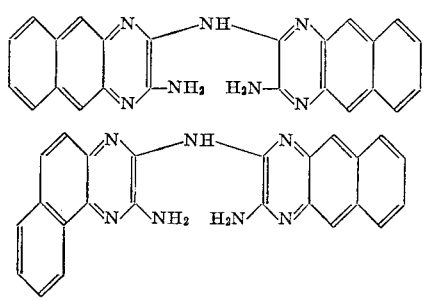

and

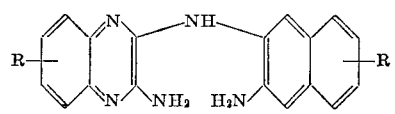

in which R denotes a hydrogen atom, a chlorine atom, a bromine atom, a low molecular weight alkyl radical or a low molecular weight alkoxy radical formed by heating diaminoquinoxalines of the formulae:

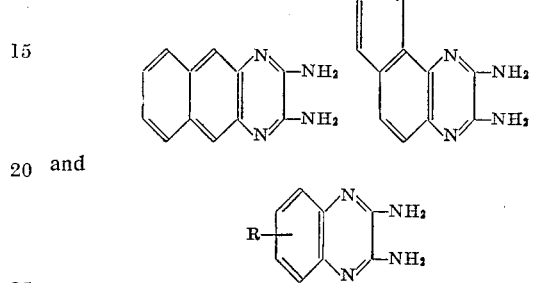

with compounds of the formulae:

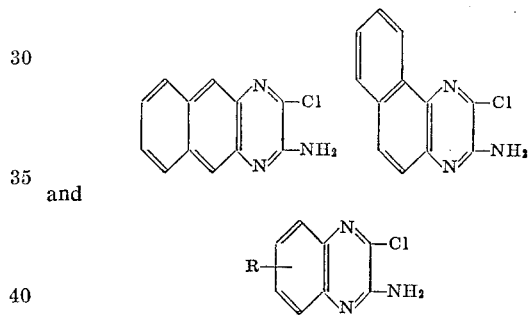

in which R has the meanings given above, in N,N-dialkylamides or N-alkyl-lactams in the presence of alkali at 80° to 200° C.

2,3-diaminoquinoxalines may be obtained by the method of Schwantes and Hinsberg, Ber. 38, 4040 (1905) by the action of dicyanogen on o-phenylenediamine, or according to Stevens, Pfister and Wolf, J. Amer. Chem. Soc. 68, 1035 (1946) by heating 2,3-dichloroquinoxaline with ammonia and methanol. The purest possible 2,3-diaminoquinoxaline is necessary for the process according to this invention, and according to the above methods such a product is obtained only by repeated recrystallization and only in a yield of about 60% of the theory. It is much more advantageous to prepare 2,3-diaminoquinoxaline by reaction of 2,3-dichloroquinoxaline with ammonia in liquid ammonia as solvent under pressure. In this way a mixture of 2,3-diaminoquinoxaline and ammonium chloride is obtained. After the ammonium chloride has been washed out with water, a diaminoquinoxaline of high purity remains in a yield of 98% of the theory and this may be converted to fluorubin without further purification. Pigments obtained from 2,3-diaminoquinoxaline prepared in the said way are superior to those obtained from a 2,3-diaminoquinoxaline prepared by one of the said two known methods, especially in their more greenish shade, purity of shade and fastness to plasticizers.

The process may also be carried out in another modified form by first heating 2,3-diaminoquinoxaline or a derivative thereof to 100° to 140° C. and then to temperatures of about 140° to 350° C. In this way splitting off ammonia and cyclization to fluorubin by way of a 2,3-diaminoquinoxaline substituted on an amino group by a 2-aminoquinoxalinyl-(3) radical, namely 3,3'-diamino- 2,2'-bis-quinoxaloimide II or its derivatives can be carried out in two stages as follows:

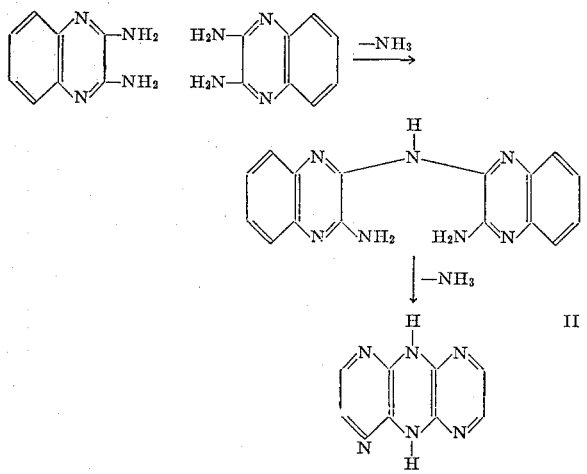

A simple embodiment of the process comprises carefully heating, for example, 2,3-diaminoquinoxaline to above its melting point of 331° C., for example for a long period at 340° C. or for a short period at 340° to 400° C., cyclization to fluorubin thus taking place with splitting off of ammonia. For better control of the reaction, however, it is expedient to heat 2,3-diaminoquinoxalines with organic solvents which boil between 100° and 350° C., for example with aliphatic or aromatic hydrocarbons or their halogen or nitro derivatives, with N,N-dialkylamides or N-alkyl-lactams or with mixtures of such solvents. Dichlorobenzene, nitrobenzene, methylnaphthalene, diphenyl, diphenyl ether, dimethylformamide, dimethylacetamide, N-methylpyrrolidone, silicone oils and paraffin oils are examples.

The duration of the reaction depends on the reaction temperature chosen and above all on the addition of suitable catalysts. In admixture with the said solvents alone, the splitting off of ammonia, which begins at about 130° C. at atmospheric pressure, proceeds very slowly. By heating up to 140° C., mainly 3,3'-diamino-2,2'-bis-quinoxaloimide or its substitution products are formed and it is only at temperatures above 140° C. that the formation of fluorubin or its substitution products proceeds with measurable speed. The amount of solvent has little influence on the reaction period. It is however preferably limited to about 1 to 5 times the weight of the 2,3-diaminoquinoxaline used. When heating to temperatures of 180° to 200° C., from about 60 to 100 hours elapse before the reaction is ended. The reaction period may be considerably shortened however by adding suitable acid catalysts, preferably in amounts of about 0.1 to 1% with reference to the weight of solvent. A larger amount of an acid may be added, for example five to ten times the weight. Inorganic and organic acids and acid reacting substances, for example salts of strong acids with weak bases are suitable as catalysts, preferably p-toluenesulfonic acid, hydrochloric acid, sulfuric acid, phosphoric acid, ammonium chloride and N-methylpyrrolidone hydrochloride. For example by adding 1% of p-toluenesulfonic acid at a reaction temperature of 200° C., the reaction period can be shortened from 60 to 18 hours.

Ammonia set free during the reaction may be removed under reduced pressure or by continuously leading thereover a stream of gas, especially an inert gas, as for example nitrogen or carbon dioxide.

When substitution or anellation products of diaminoquinoxaline are used, the products obtained after the reaction are fluorubins substituted or anellated in rings A and E and may be symmetrical or unsymmetrical position isomers with respect to an axis through ring C, or may be mixtures of the same.

If the process according to this invention is carried out with mixtures of two different 2,3-diaminoquinoxalines, then mixtures of fluorubins corresponding to the reactivity of the initial materials are obtained which may consist of unsubstituted, unilaterally substituted or anellated, bilaterally uniformly or non-uniformly substituted or anellated fluorubin or its symmetrical or unsymmetrical position isomers. Fluorubins which are substituted or anellated only in ring A or only in ring E, or which are substituted or anellated differently in ring A and ring E, are preferably obtained by effecting cyclization with a 3,3'-diamino-2,2'-bis-quinoxaloimide having appropriate substitution or anellation in the benzene nucleus. These substituted or anellated 3,3'-diamino-2,2'-bis-quinoxaloimides may be obtained in an advantageous way for example from 2,3-diamino-quinoxaline which may if desired be substituted or anellated at the benzene nucleus and a 2-amino-3-chloroquinoxaline which is not substituted or anellated at the benzene nucleus or which is differently substituted or anellated. Cyclization is then effected in the manner described by splitting off one molecule of ammonia.

Unsubstituted fluorubin is obtained in an entirely analogous way from 2,3-diaminoquinoxaline and 2-amino-3-chloroquinoxaline.

The necessary 2-amino-3-chloroquinoxaline and compounds thereof substituted or anellated in the benzene ring may be prepared from the corresponding 2,3-dichloroquinoxalines by treatment for about 5 hours with liquid ammonia at temperatures of about −10° to +30° C. under pressure.

The following examples illustrate but do not limit this invention. Parts and percentages are by weight.

Example 1

100 parts of 2,3-dichloroquinoxaline is heated with 250 parts of anhydrous ammonia in an autoclave of appropriate size fitted with a stirrer at a temperature of 90° C. for 4 hours so that a pressure of about 65 atmospheres gauge is set up. After cooling the autoclave, the excess ammonia is blown off and the reaction product is washed with water until it is free from chloride and then dried. 78.8 parts of pure 2,3-diaminoquinoxaline is obtained; this is a yield of 98% of the theory.

100 parts of 2,3-diaminoquinoxaline and 500 parts of N-methylpyrrolidone are heated for 65 hours at 205° C. in a flask fitted with a stirrer while leading nitrogen thereover. After the reaction mixture has been cooled to 100° C., the coarsely crystalline product is filtered under slightly reduced pressure and washed with 200 parts of methanol. The product is dried and 67 parts (75% of the theory) of a dark brown crystalline product is obtained which at 360° C. has not melted. By rubbing out the shade of the crystals becomes yellow. The fluorubin thus obtained dissolves in 96% sulfuric acid with a blue-red color.

For the conversion of this fluorubin into a yellow pigment, for example 30 parts of the crude fluorubin is dissolved in 700 parts of 96% sulfuric acid at 20° C., cooled and 140 parts of water added, the red-brown fluorubin sulfate thus precipitated dissolved again in 96% sulfuric acid and this solution allowed to flow into a mixture of ice and an excess of 25% ammonia water. After filtration and drying, 29.4 parts (98% of the theory) of a greenish yellow pigment is obtained.

To prepare a yellow gravure printing color, for example 5 parts of the pigment is ground in a ball mill with a nitrocellulose solution which consists of 10 parts of alcohol-soluble nitrocellulose, 5 parts of dibutyl phthalate, and 80 parts of a mixture of ethyl alcohol and ethyl glycol. The color is very suitable for prints fast to light and overspraying.

Example 2

100 parts of 2,3-diaminoquinoxaline, 400 parts of N-methylpyrrolidone and 4 parts of p-toluenesulfonic acid are heated at reflux temperature (205° C.) for eighteen hours while leading thereover a small amount of nitrogen.

After the whole has been cooled to room temperature, the coarsely crystalline pale brown product is filtered off by suction and washed with 200 parts of methanol. After drying, 76 parts (18% of the theory) of pale brown crystals is obtained which are still solid at 360° C.

By using 400 parts of the eutectic mixture of diphenyl and diphenyl ether instead of 400 parts of N-methylpyrrolidone and heating the mixture to boiling for ten hours, 83 parts of fluorubin (93% of the theory) is obtained by following the same method.

83.7 parts (95% of the theory) of fluorubin is obtained in the same way by using 150 parts of α-methylnaphthalene or a mixture of 4 parts of α-methylnaphthalene and 6 parts of β-methylnaphthalene or a fraction of dimethylnaphthalenes having the boiling point 250° to 260° C. instead of 400 parts of N-methylpyrrolidone and heating for ten hours at the boil.

The fluorubins thus obtained may be converted in a yield of about 98% of the theory and in the same way as in Example 1 into a form suitable for pigment purposes.

Example 3

100 parts of 2,3-diamino-6-methylquinoxaline, prepared from 2,3-dichloro-6-methylquinoxaline with liquid ammonia according to Example 1, paragraph 1, is heated to boiling (205° C.) with 400 parts of N-methylpyrrolidone and 4 parts of p-toluenesulfonic acid for twenty hours. The whole is cooled to room temperature and the dark brown coarsely crystalline residue is filtered off, washed with 200 parts of methanol and dried. 75 parts (83% of the theory) of a brown coarsely crystalline dimethylfluorubin is obtained which is either 2,9- or 2,10-dimethylfluorubin or a mixture of the two isomers. It may be converted into a very productive reddish yellow pigment by the method described in paragraph 3 of Example 1.

Analysis gives the composition: $C_{18}H_{14}N_6$.

Calculated: C, 68.8; H, 4.46; N, 26.7. Found: C, 68.7; H, 4.3; N, 26.6.

If the 100 parts of 2,3-diamino-6-methylquinoxaline in the procedure of Example 3, paragraph 1, be replaced by 100 parts of 2,3-diamino-5-methylquinoxaline (prepared from 2,3-dichloro-5-methylquinoxaline and liquid ammonia according to Example 1), 1,8- or 1,11-dimethylfluorubin or a mixture of the two isomers is obtained in an analogous way. This product may be converted into a reddish yellow pigment by the method described in Example 1, paragraph 3.

According to analysis, the compound has the composition: $C_{18}H_{14}N_6$.

Calculated: C, 68.8; H, 4.4; N, 26.7. Found: C, 68.9; H, 4.6; N, 26.6.

Example 4

100 parts of 2,3-diamino-6-chloroquinoxaline (prepared from 2,3,6-trichloroquinoxaline with liquid ammonia by the method of Example 1), 400 parts of N-methylpyrrolidone and 4 parts of p-toluenesulfonic acid are heated at the boil (205° C.) for twenty hours while leading nitrogen thereover. The whole is cooled to room temperature and the dark brown coarsely crystalline residue is filtered off and washed with 200 parts of methanol. 74 parts (81% of the theory) of a brown crystalline dichlorofluorubin is obtained which is either 2,9- or 2,10-dichlorofluorubin or a mixture of the two isomers. The product may be brought into a form suitable for use as a pigment by the method described in Example 1, paragraph 3. The very strongly greenish yellow pigment is characterized by the purity and clarity of its shade and also by its high color strength.

According to analysis the compound has the composition: $C_{16}H_8N_6Cl_2$.

Calculated: C, 54.1; H, 2.2; N, 23.6; Cl, 20.0. Found: C, 53.5; H, 2.4; N, 23.6; Cl, 19.7.

Example 5

100 parts of 2,3-diaminoquinoxaline and 4 parts of p-toluenesulfonic acid are heated in 400 parts of N-methylpyrrolidone for twenty hours at 140° C. The whole is cooled and the yellow crystals are filtered off and washed with 200 parts of methanol. 74.5 parts (78% of the theory) of 3,3′-diamino-2,2′-bis-quinoxaloimide is obtained. The compound decomposes at about 360° C. upward with splitting off of ammonia. It is soluble in dilute hydrochloric acid with a pale reddish fluorescence. The compound dissolves in 98% sulfuric acid with a brown red color.

The same compound is obtained by heating 100 parts of 2,3-diaminoquinoxaline, 112 parts of 2-amino-3-chloroquinoxaline and 66 parts of anhydrous sodium carbonate in 1000 parts of dimethylformamide for two hours at the boiling temperature. The whole is cooled and filtered and 113.5 parts (60% of the theory) of 3,3′-diamino-2,2′-bis-quinoxaloimide is obtained in the form of yellow crystals with the properties specified above.

According to analysis the compound has the composition: $C_{16}H_{13}N_7$ (303.3).

Calculated: C, 63.30; H, 4.28; N, 32.30. Found: C, 63.11; H, 4.17; N, 32.22.

The 2-amino-3-chloroquinoxaline used may be prepared as follows:

300 parts of 2,3-dichloroquinoxaline is stirred with 1000 parts of condensed ammonia in an autoclave of appropriate size fitted with a stirrer for five hours at 20° C. so that a gauge pressure of 25 atmospheres is set up. The excess of ammonia is slowly distilled off. After water has been added to the contents of the autoclave, the whole is stirred until the reaction mixture is a suspension well capable of being filtered. The reaction product is filtered off, washed free from chloride with water and dried. 265 parts (98% of the theory) of 2-amino-3-chloroquinoxaline is obtained in the form of pale yellow crystals having the melting point 144° to 146° C.

According to analysis, the substance has the composition: $C_8H_6N_3Cl$.

Calculated: C, 53.5; H, 3.3; N, 23.4; Cl, 19.7. Found: C, 53.1; H, 3.5; N, 23.3; Cl, 19.5.

Example 6

100 parts of 3,3′-diamino-2,2′-bis-quinoxaloimide prepared according to Example 5 is heated in 300 parts of N-methylpyrrolidone with 3 parts of p-toluenesulfonic acid for ten hours at the boiling temperature (205° C.). At the end of this period, splitting off of ammonia is practically ended. The product is filtered off and washed with methanol. The yield of fluorubin is 85 parts, which is 98% of the theory.

According to analysis the compound has the composition $C_{16}H_{10}N_6$ (286).

Calculated: C, 67.1; H, 3.5; N, 29.4. Found: C, 67.4; H, 3.7; N. 29.2, and has the same properties as the fluorubin obtained according to Example 1.

Example 7

The processes described in Example 5, paragraph 1, and in Example 6 may also be carried out in a single vessel by heating 100 parts of 2,3-diaminoquinoxaline with 4 parts of p-toluenesulfonic acid in 400 parts of N-methylpyrrolidone at first for twenty hours at 140° C. and then raising the temperature to the boiling temperature (205° C.). After the whole has been kept for another twenty hours at boiling temperature, the product is filtered off by suction and washed with 200 parts of methanol. 76 parts (85% of the theory) of a product is obtained in the form of pale brown crystals which is identical with the fluorubin prepared according to Example 6.

Example 8

100 parts of 2,3-diamino-6-methoxyquinoxaline, 94.5 parts of 2-amino-3-chloroquinoxaline and 29.5 parts of anhydrous sodium carbonate are heated in 1000 parts of dimethylformamide for two hours at the boiling point. The product is filtered off by suction, washed with 200 parts of water and then with 200 parts of methanol. 124.2 parts of 3,3'-6 (or 7)-methoxy-2,2'-bis-quinoxaloimide is obtained in the form of brown yellow crystals. To process this to 2-methoxyfluorubin, 100 parts of the said imide is heated under reflux (205° C.) with 3 parts of p-toluenesulfonic acid in 500 parts of N-methylpyrrolidone for ten hours. By this time the evolution of ammonia has practically ended. The crystals are filtered off and washed with 200 parts of methanol. 73 parts (77% of the theory) of 2-methoxyfluorubin is obtained in the form of brown crystals which are still solid at 360° C.

According to analysis, the substance has the composition: $C_{17}H_{12}ON_6$ (316).

Calculated: C, 64.6; H, 3.8; O, 5.0; N, 26.5. Found: C, 64.4; H, 4.0; O, 5.2; N, 26.3.

The compound dissolves in 98% sulfuric acid with a deep blue color and when brought into fine dispersion by one of the usual methods, such as that described in Example 1, paragraph 3, gives a reddish yellow pigment which, like unsubstituted fluorubin, is suitable for pigmenting lacquers, varnishes, printing colors and plastics.

Example 9

19.4 parts of 2-chloro-3-amino-6-methylquinoxaline, 19.5 parts of 2,3-diamino-6-chloroquinoxaline, 5.3 parts of anhydrous sodium carbonate and 150 parts of dimethylformamide are heated at the boil for three hours. The reaction product is filtered off by suction, washed with 200 parts of water and then with 200 parts of methanol. 11.6 parts of 3,3'-diamino-6(7)-chloro-6'-methyl-2,2'-bis-quinoxaloimide is obtained in the form of pale brown crystals. The compound decomposes at about 380° C. upward with splitting off of ammonia. It dissolves in 98% sulfuric acid with a dark red color.

To process this to 2-methyl-9(10)-chlorofluorubin, 10 parts of the said imide is heated at the boil in a solution of 0.5 part of p-toluenesulfonic acid in 150 parts of N-methylpyrrolidone for twenty hours. The reaction product is filtered off by suction and washed with 200 parts of methanol. 8.2 parts of 2-methyl-9(10)-chlorofluorubin is obtained in the form of brown crystals which are still solid at 360° C.

Analysis of the reaction product gives the composition: $C_{17}H_{11}N_6Cl$ (334.5).

Calculated: C, 61.1%; H, 3.3%; N, 25.1%; Cl, 10.6%. Found C, 60.9%; H, 3.5%; N, 24.8%; Cl, 10.8%.

The compound dissolves in 98% sulfuric acid with a blue red color and may be converted into a reddish yellow pigment by one of the conventional methods, such as that described in Example 1, paragraph 3.

Example 10

10 parts of 2,3-diamino-6,7-benzoquinoxaline, prepared from 2,3-dichloro-6,7-benzoquinoxaline with liquid ammonia by the method of Example 1, is heated at the boil in a mixture of 1 part of p-toluenesulfonic acid and 40 parts of α-methylnaphthalene for twenty hours. After having been cooled to room temperature, the dark brown residue is filtered off and washed with 200 parts of methanol. 8 parts of 2,3-9,10-dibenzofluorubin (88% of the theory) is obtained. It is still solid at 360° C. and dissolves in 98% sulfuric acid with a deep blue color.

Analysis of the reaction product gives the composition: $C_{24}H_{14}N_6$ (386).

Calculated: C, 74.6%; H, 3.6%; N, 21.7%. Found: C, 74.0%; H, 3.8%; N, 20.6%.

The compound is very easily sulfonated by concentrated sulfuric acid. For this reason the sulfuric acid used in the method described in Example 1, paragraph 3, for the conversion of the product into a form suitable as a pigment, is replaced by an equal amount of dichloroacetic acid. An orange pigment is obtained having good fastness properties.

Example 11

7 parts of 2,3-diamino-5,6-benzoquinoxaline is heated at the boil in a solution of 0.2 part of p-toluenesulfonic acid in 30 parts of α-methylnaphthalene for twenty hours. The whole is cooled to room temperature and the reaction product filtered off and washed with 100 parts of methanol. 3.5 parts of 1,2-8,9(10,11)-dibenzofluorubin is obtained in the form of dark brown crystals which do not melt at 360° and which dissolve in 98% sulfuric acid with a blue color.

Analysis of the compound gives the composition: $C_{24}H_{14}N_6$ (386).

Calculated: C, 74.6%; H, 3.6%; N, 21.7%. Found: C, 75.3%; H, 3.8%; N, 20.4%.

The reaction product may be converted into a yellowish orange pigment having good fastness properties in the way described in Example 10.

Example 12

16 parts of 2,3-diaminoquinoxaline, 18 parts of 2-amino-3-chloroquinoxaline and 100 parts of N-methylpyrrolidone are heated at the boil for twenty hours. After the whole has been cooled to room temperature, the reaction product is filtered off by suction, washed with 100 parts of methanol and then with 1000 parts of water until the wash water is free from chloride. 21.1 parts of fluorubin is obtained in the form of dark brown crystals; this is a yield of 74% of the theory.

The fluorubin thus obtained is converted by the method described in Example 1, paragraph 3, into a greenish yellow pigment in a 98% yield; the pigment has the properties specified in Example 1.

We claim:
1. A process for the production of a compound selected from the class consisting of the compounds having the formulae:

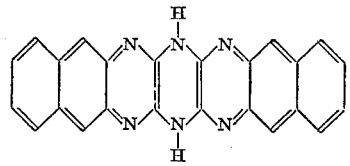

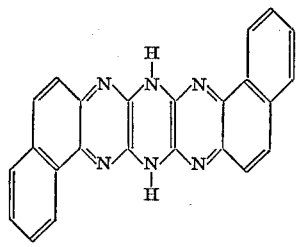

and

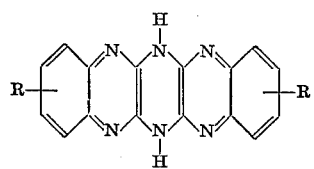

in which R denotes a radical selected from the class consisting of a hydrogen atom, a chlorine atom, a bromine atom, alkyl of 1 to 4 carbon atoms and alkoxy of 1 to 4 carbon atoms, said process comprising heating in a liquid, organic diluent to 100° to 400° C. a diaminoquinoxaline selected from the class consisting of:

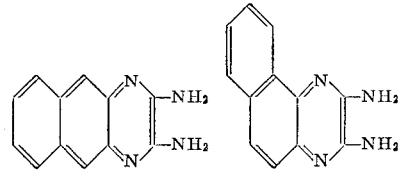

and

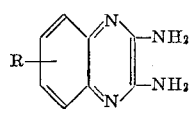

in which R has the meaning given above in the presence of an acid catalyst selected from the class consisting of aromatic sulfonic acids, mineral acids and salts of strong acids with weak bases.

2. A process as claimed in claim 1, wherein said organic diluent is selected from the class consisting of N,N-dialkylamides, N-alkyl-lactams, naphthalenes, diphenyl and diphenyl ether.

3. A process according to claim 1 wherein the heating is carried out in the presence of one to five times the weight, with reference to the diaminoquinoxaline used, of an N-alkyl-lactam selected from the class consisting of N-methylpyrrolidone-(2) and N-ethylpyrrolidone-(2).

4. A process according to claim 1 wherein a diaminoquinoxaline selected from the class consisting of:

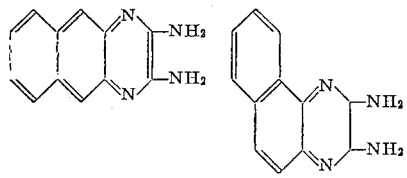

and

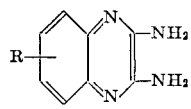

in which R denotes a radical selected from the class consisting of a hydrogen atom, a chlorine atom, a bromine atom, alkyl of 1 to 4 carbon atoms and alkoxy of 1 to 4 carbon atoms and a low molecular weight alkoxy radical is converted by heating to 100° to 140° C. in a liquid, organic diluent into a compound selected from the class consisting of:

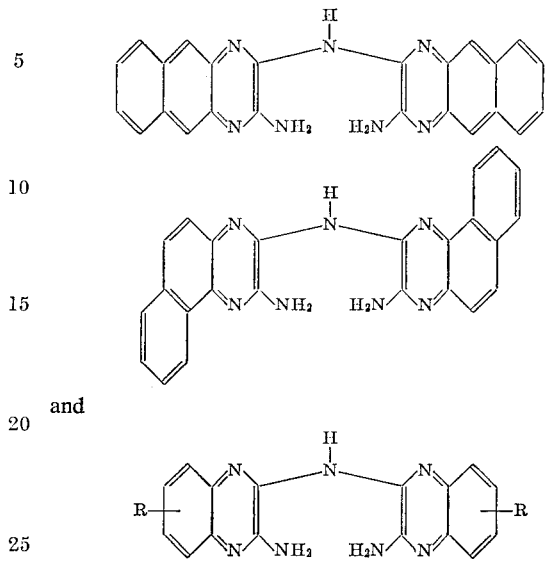

and in which R has the meaning given above and this compound is then condensed to said compound as defined in claim 1 by further heating to 140° to 400° C. and splitting off a molecule of ammonia.

5. A process for the production of a fluorubin dyestuff which comprises heating in an inert organic solvent and at a temperature of from 200° C. to its melting point a diaminoquinoxaline of the formula

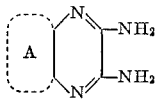

wherein A is a member selected from the group consisting of phenylene, naphthylene, and phenylene substituted by a member selected from the group consisting of halogen, lower alkyl and lower alkoxy.

References Cited

UNITED STATES PATENTS 3,211,694 10/1965 Altermatt _____ 260—250 X
3,326,915 6/1967 Jackson et al. _____ 260—250

OTHER REFERENCES

Bladin: Chemische Berichte, vol. 18 (1885), pp. 666–74.

Schipper et al.: J. Amer. Chem. Soc., vol. 73 (1951), p. 5674.

Hollins: The Synthesis of Nitrogen Ring Compounds, pp. 336–346, D. Van Nostrand Co., New York (1924).

Degering: Organic Nitrogen Compound, pp. 661 and 671, University Lithoprinters, Ypsilanti (1945).

Morton: The Chemistry of Heterocyclic Compounds, Second Impression, p. 517, McGraw-Hill Book Co., Inc. (1946).

Rodd: Chemistry of Carbon Compound, vol. IV, part B, Heterocyclic Compounds, pp. 1348 and 1372–1380 (1959).

NICHALOS S. RIZZO, *Primary Examiner.*

DONALD G. DAUS, *Assistant Examiner.*

U.S. Cl. X.R.

106—23, 288; 260—326.5

UNITED STATES PATENT OFFICE
CERTIFICATE OF CORRECTION

Patent No. 3,419,557

December 31, 1968

Werner Deuschel et al.

It is certified that error appears in the above identified patent and that said Letters Patent are hereby corrected as shown below:

Column 7, line 4, "18%" should read -- 85% --. Column 11, lines 45 to 54, the right-hand portion of the formula should appear as shown below:

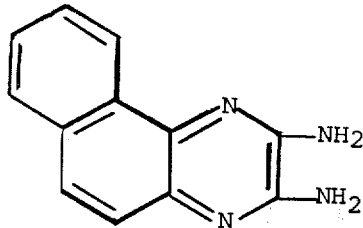

Signed and sealed this 21st day of April 1970.

(SEAL)
Attest:

Edward M. Fletcher, Jr.
Attesting Officer

WILLIAM E. SCHUYLER, JR.
Commissioner of Patents